UNITED STATES PATENT OFFICE.

ARTHUR ARENT, OF DES MOINES, IOWA.

ART OF PROTECTIVELY TREATING MATERIALS.

1,388,825.  Specification of Letters Patent.  Patented Aug. 23, 1921.

No Drawing.  Application filed February 5, 1919. Serial No. 275,242.

*To all whom it may concern:*

Be it known that I, ARTHUR ARENT, a citizen of the United States, residing at Des Moines, in the county of Polk and State of Iowa, have invented certain new and useful Improvements in the Art of Protectively Treating Materials; and I do hereby declare the following to be a full, clear, and exact description of the invention, such as will enable others skilled in the art to which it appertains to make and use the same.

This invention relates to the art of protectively treating materials, more particularly, but not exclusively, fibrous materials such as wood, wood pulp, paper, canvas, duck, textile fabrics generally, and especially cloth used for aeroplane wings, hangar tents, balloons, etc. The invention also relates to the preparation of useful plastics derived from cellulose and characterized by non-inflammability or relatively low inflammability as compared to plastics of this type heretofore known.

The invention comprises novel treating compositions and their preparation, processes of applying such compositions to or incorporating them with materials to be improved or altered in character, and novel products resulting from such processes.

In part, the broad subject matter hereinafter set forth is disclosed in my copending application Ser. No. 254,958, filed September 25, 1918, of which the present application is to that extent a continuation.

Generally described, the invention involves the use of a fire-retardant metal compound to render combustible materials completely non-inflammable, or to lower their inflammability to any desired extent. As herein employed, the term non-inflammable is applied to material which merely chars upon exposure to direct contact with flame, but does not inflame or continue to burn after removal of the applied flame.

My prior application aforesaid describes particularly the use of compounds of antimony for the general purposes above set forth; and in particular said prior application discloses the use of antimony trichlorid, especially when dissolved in a carbon chlorid solvent such as carbon tetrachlorid. I have now found that still more effective treating solutions of antimony compounds, and particularly of antimony trichlorid, can be prepared by the use of certain other solvents among which amyl acetate is preëminently desirable for many purposes. I have also found that the use of fire retardant antimony compounds can be extended with great advantage to the preparation of novel products which are non-inflammable though composed chiefly of highly inflammable materials.

For the sake of affording a clear understanding of the invention, certain specific embodiments thereof will be hereinafter described in detail; but such examples are to be understood as merely illustrative of the broad principles involved and not as limiting the scope of the invention.

I have found that by dissolving antimony trichlorid in amyl acetate, the resultant solution can be used either alone or in conjunction with other materials for coating or impregnating articles whose combustibility it is desired to reduce. I have found that amyl acetate will dissolve this compound very freely, thus permitting it to be applied to or introduced into material to be treated and distributed thereover or therethrough uniformly and in sufficient quantity to insure effective fireproofing. The concentration of this amyl acetate solution may vary considerably, but in practice I have found it convenient to employ a saturated solution which can be diluted, if necessary, according to the particular material to be treated. Such saturated solution can readily be prepared by shaking an excess of pure antimony trichlorid crystals with amyl acetate and allowing the mixture to stand for a few hours at ordinary temperatures. Such a solution applied with a brush or otherwise to canvas or other fabric, for example, gives a deposit of the antimony salt in and on the fiber which, after slow evaporation of the solvent, oxidizes gradually by action of the air, or more rapidly if the canvas be specially treated with water, steam or moist air, with formation of highly fire resistant basic chlorids or oxychlorids or antimony in and on the fabric. These oxychlorids are insoluble in water and adhere tenaciously to the fibers; so that the fabric does not lose its fireproofed character even upon exposure to weather. A still more advantageous method of procedure is to mix the amyl acetate solution of antimony trichlorid with a drying oil such as linseed oil, and to apply this mixture to the canvas or other fibrous material to be treated. This results in a thoroughly waterproofed canvas or other fabric which, at the same time, is also non-inflammable. I have found a mixture consisting of equal parts by volume of linseed oil and a saturated solution of antimony trichlorid in amyl acetate to be particularly effective in practice. After evaporation of the amyl acetate from the treated fabric and exposure to the atmosphere until the surface is no longer tacky, the fabric is perfectly waterproofed and at the same time can not be made to take fire even upon direct application of a flame, the fabric merely charring at the region where the flame is applied. According to another way of carrying out this phase of the invention, the antimony salt may be dissolved directly in or mixed with the linseed oil or other drying oil employed, without using a special solvent such as amyl acetate. The resultant mixture can be applied in the same manner to the materials to be protected and the resultant fabric is found to be waterproofed and at the same time is non-inflammable.

An amyl acetate solution of antimony trichlorid can be advantageously mixed with varnishes of various kinds to give mixtures which can be used like ordinary varnishes to produce protective coatings which are, however noninflammable as opposed to the high inflammability characterizing ordinary varnishes. The term varnishes is employed herein in a broad sense to include not only solutions of natural or artificial gums and resins, but also solutions of cellulose and cellulose derivatives such as cellulose nitrates, cellulose acetates, viscose, etc.

It is evident also that, in addition to varnishes, other liquid coating and impregnating compositions such as paints, stains and the like, comprising coloring matter in the form of pigments or dye stuffs, carried by a suitable vehicle, can also be modified by the addition of an antimony salt such as antimony trichlorid, either by direct solution thereof in the vehicle or by addition of a solution of such salt in amyl acetate or other appropriate solvent.

Solutions of cellulose esters, such as nitrate or acetate, are well known to be highly efficient shrinking agents, or "dopes" for the fabric employed in aeroplane wings, balloons, etc.; and when such solutions are modified in accordance with the present invention, as for example by the addition of antimony trichlorid thereto, the further advantage is attained of rendering the fabric positively non-inflammable. "Dopes" of this kind may be prepared by adding to the cellulose ester varnish a solution of an antimony salt in a compatible volatile solvent, such as amyl acetate, or the antimony salt may be dissolved directly in the ester varnish provided the varnish solvent or solvents are of the proper character. Thus, a very effective "dope" may be prepared by directly dissolving antimony trichlorid crystals in a solution containing a soluble form of cellulose, such as collodion, the ether-alcohol solvent taking up the antimony trichlorid readily. The amount of antimony salt used may vary, but in a typical example a saturated solution of antimony trichlorid crystals in collodion gives excellent results when applied to aeroplane cloth, the treated cloth being thereby stretched to drum tension on the frame and being non-inflammable. So far as I am aware, this is the first instance of a truly non-inflammable cellulose nitrate composition, although the addition of certain substances heretofore suggested has perhaps resulted in somewhat reducing the excessively high degree of inflammability possessed by nitrated cellulose. Similarly, although cellulose acetate is less inflammable than the nitrate and may have had its inflammability still further reduced by the addition of fire retardants heretofore suggested, the incorporation of antimony trichlorid with cellulose acetate dopes and varnishes in accordance with the present invention renders the resultant protective coating literally non-inflammable, a result also believed to be novel.

Another useful application of the invention is in the production of shaped cellulose plastics which are non-inflammable and novel in the art. For example, a moving picture film of celluloid or cellulose acetate can be superficially treated with a solution of antimony trichlorid in collodion, amyl acetate being most desirably, but not necessarily, present in the mixture. Upon evaporation of the solvent or solvents present, it is found that the treated film will merely char upon application of the flame directly thereto, but will not inflame or continue to burn after the flame is taken away. This holds true whether the flame be applied broadside or edgewise of the film, edgewise application being the more severe test especially when the sheet or film is held in a vertical plane and the flame applied at the lower edge. The importance of this in the moving picture art is obvious. Thereafter, the very thinly coated film may be washed with water and the resultant slight superficial deposit of oxychlorids of antimony be wiped off in order not to interfere with the transparency of the film. According to tests which I have conducted, it appears that, notwithstanding the fact that a film of celluloid or the like is penetrable by and will take up water to a very appreciable extent, the portion of the antimony salt which is below the outer surface of the film coating undergoes no perceptible hydrolyzation even after long exposure to atmosphere and hence does not materially affect the film transparency, while at the same time it is effective in thoroughly fireproofing the film.

Furthermore, the non-inflammability of the film is not diminished by repeated and prolonged washing of the film in water, owing to the substantially complete insolubility of the fireproofing agent in water.

Instead of applying a treating solution of an antimony salt to preformed bodies of cellulose esters or other cellulose plastic material, it is evident that the antimony salt may be incorporated with such plastic material before they attain their final solid or set condition. For example, the antimony salt may be added to the cellulose ester solutions from which motion picture or other photographic films are made according to known methods. Similarly, in the manufacture of articles from celluloid, the antimony salt may be incorporated into the still plastic mass of celluloid-forming materials with the alcohol or other solvent employed, or by the aid of heat. Ordinarily it is most convenient to do this by mixing or kneading into the plastic mass a solution of antimony trichlorid in alcohol, alcohol-ether, or amyl acetate. The term celluloid is used here in a broad sense to include all celluloid-like compositions, whether or not these are the usual pyroxylin-camphor compositions of the ordinary type.

Another especially valuable product which may be prepared in accordance with the invention is a grease-proof and waterproof paper which can be made by coating or impregnating, or both, paper with collodion or other cellulosic solution containing a fire retardant compound, especially antimony trichlorid dissolved therein.

Matter disclosed but not specifically claimed in this application forms the subject matter of my divisional applications Ser. Nos. 441,082 and 441,083, both filed January 29, 1921.

For the purposes of the present invention, a fire-retardant metal compound which is soluble in alcohol, amyl acetate, a chlorid of carbon, or other non-aqueous solvent, but which is insoluble in water or decomposed by water even in very small quantity, with formation of an insoluble compound, is most desirable. Antimony trichlorid in pure anhydrous form answers these requirements very completely and hence is preferred herein. Hydrolyzable salts of other metals such as zinc, tin and the like do not yield as good results as antimony salts and are accordingly less desirable for present purposes. Zinc and tin chlorids, for example, are soluble in water and therefore can be washed out of material impregnated therewith; while on the other hand an antimony salt such as the chlorid is not soluble in water but is immediately decomposed into products which are also water-soluble. Fire-retardants of the antimony salt type are therefore much more effective and desirable for the purposes of the present invention.

What I claim is:

1. The process of protectively treating material which comprises applying thereto a solution of a fire-retardant hydrolyzable metal compound in a menstruum comprising amyl acetate.

2. The process of protectively treating material which comprises applying thereto a solution of a fire-retardant antimony compound soluble in and dissolved in a solvent comprising amyl acetate.

3. The process of protectively treating material which comprises applying thereto a solution of antimony trichlorid in a solvent comprising amyl acetate.

4. The process of protectively treating material which comprises applying thereto a fire-retardant solution of an antimony salt in collodion.

5. The process of protectively treating material which comprises applying thereto a fire-retardant solution of antimony trichlorid in collodion.

6. The process of protectively treating material which comprises applying thereto a fire-retardant solution comprising a soluble form of cellulose, an antimony salt, and a solvent for both.

7. The process of protectively treating material which comprises applying thereto a fire-retardant solution comprising a soluble form of cellulose, antimony trichlorid, and a solvent for both.

8. The process of preparing a liquid treating composition which comprises dissolving antimony trichlorid in amyl acetate, and mixing the solution with a varnish.

9. As a new composition of matter, a liquid material comprising antimony trichlorid, a cellulose nitrate, and a solvent for both, said liquid yielding a substantially non-inflammable residue upon drying.

10. As a new composition of matter, a liquid material comprising antimony trichlorid, a cellulose compound, and a solvent for both, said liquid yielding a substantially non-inflammable residue upon drying.

11. As a new composition of matter for fireproofing and like purposes, a mixture of a cellulose ester and a fire-retardant hydrolyzable metal salt in a non-aqueous menstruum, said mixture yielding a substantially non-inflammable residue upon drying.

12. As a new composition of matter for fire-proofing and like purposes, a mixture of a cellulose ester and antimony trichlorid in a non-aqueous menstruum, said mixture yielding a substantially non-inflammable residue upon drying.

13. As a new composition of matter, a liquid material comprising an antimony compound, a cellulose nitrate, and a solvent for both, said liquid yielding a substantially non-inflammable residue upon drying.

14. As a new composition of matter, a liquid material comprising collodion having an antimony compound dissolved therein, said liquid yielding a substantially non-inflammable residue upon drying.

15. As a new composition of matter, a liquid material comprising collodion having antimony trichlorid dissolved therein, said liquid yielding a substantially non-inflammable residue upon drying.

16. As a new composition of matter, a solution of an antimony salt of a mineral acid in amyl acetate, said solution yielding a substantially non-inflammable residue upon drying.

17. As a new composition of matter, a solution of antimony trichlorid in amyl acetate, said solution yielding a substantially non-inflammable residue upon drying.

18. As a new composition of matter, a solution of a hydrolyzable fire-retardant metal compound in a menstruum comprising amyl acetate, said solution yielding a substantially non-inflammable residue upon drying.

19. As a new composition of matter, a liquid material comprising a cellulose compound, a water-insoluble antimony compound, and amyl acetate, said liquid yielding a substantially non-inflammable residue upon drying.

20. As a new composition of matter, a liquid material comprising a cellulose compound, antimony trichlorid, and amyl acetate, said liquid yielding a substantially non-inflammable residue upon drying.

21. As a new composition of matter, a mixture of collodion, amyl acetate, and a water-insoluble antimony compound, said mixture yielding a substantially non-inflammable residue upon drying.

22. As a new composition of matter, a mixture of collodion, amyl acetate, and antimony trichlorid, said mixture yielding a substantially non-inflammable residue upon drying.

23. As a new fire-retardant coating composition, the combination with a varnish base, of a vehicle comprising amyl acetate, and a water-insoluble antimony compound.

24. As a new fire-retardant coating composition, the combination with a varnish base, of a vehicle comprising amyl acetate, and antimony trichlorid.

25. As a new fire-retardant composition of matter, a non-aqueous liquid material comprising coloring matter, a vehicle therefor, and a water-insoluble antimony compound dissolved in said vehicle.

26. As a new fire-retardant composition of mater, a liquid material comprising coloring matter, a vehicle therefor, and antimony trichlorid dissolved in said vehicle.

27. As a new article of manufacture, the combination, with fibrous material, of an adherent composition comprising a cellulose plastic containing a water-insoluble antimony compound in sufficient quantity to render the combination non-inflammable.

28. As a new article of manufacture, the combination, with fibrous material, of an adherent composition comprising a cellulose plastic containing a chlorid of antimony in sufficient quantity to render the combination non-inflammable.

29. As a new article of manufacture, the combination, with fibrous material, of an adherent composition comprising a cellulose plastic containing a chlorid of antimony, said combination being substantially non-inflammable.

30. As a new article of manufacture, paper coated with a cellulose plastic composition containing a hydrolyzable fire-retardant, metal compound in sufficient quantity to render the combination non-inflammable, said article being substantially waterproof, and charring upon exposure to direct contact with flame but not inflaming.

31. As a new article of manufacture, paper coated with a mixture of collodion with a hydrolyzable fire-retardant metal compound.

32. As a new article of manufacture, paper coated with a fire-retardant mixture of collodion with an antimony salt.

33. As a new composition of matter, a liquid mixture for waterproofing and fireproofing comprising a cellulose compound, a fire-retardant hydrolyzable metal compound, and a liquid vehicle, said metal compound being present in sufficient quantity to render a dry coating of said mixture non-inflammable.

In testimony whereof I hereunto affix my signature.

ARTHUR ARENT.